(12) United States Patent
Kao

(10) Patent No.: US 7,976,617 B2
(45) Date of Patent: Jul. 12, 2011

(54) MULTICHANNEL CIRCULATION OXYGEN GENERATOR

(75) Inventor: Ta Hai Kao, Tainan (TW)

(73) Assignee: Yuun Tong Electronic Enterprise Co., Ltd., Tainan (TW)

( * ) Notice: Subject to any disclaimer, the term of this patent is extended or adjusted under 35 U.S.C. 154(b) by 333 days.

(21) Appl. No.: 12/289,045

(22) Filed: Oct. 20, 2008

(65) Prior Publication Data

US 2010/0095850 A1 Apr. 22, 2010

(51) Int. Cl.
*B01D 53/04* (2006.01)

(52) U.S. Cl. ............... 96/108; 96/121; 96/113; 96/140; 128/200.24

(58) Field of Classification Search ............... 96/108, 96/140; 128/200.24
See application file for complete search history.

(56) References Cited

U.S. PATENT DOCUMENTS

| 3,922,149 A | * | 11/1975 | Ruder et al. | ............... 95/22 |
| 5,922,178 A | * | 7/1999 | Isenberg | ............... 204/265 |
| 2010/0095960 A1 | * | 4/2010 | Kao | ............... 128/202.26 |

* cited by examiner

*Primary Examiner* — Duane Smith
*Assistant Examiner* — Christopher P Jones
(74) *Attorney, Agent, or Firm* — Bacon & Thomas, PLLC

(57) ABSTRACT

A multi-channel circulation oxygen generator, comprising a body shell, a top cover set and a base set; the body shell is provided with at least two big tanks for loading molecular sieve substances at its internal, having a set of gas passage, a set of gas intake passage, a gas storage tank and a set of gas outtake passage at its surrounding, and providing with a plurality of orderly arranged heat dissipation ribs shaped at its outer surface; the top cover set caps the top side of the body shell, and its bottom side corresponding to the big tank is provided with filtration and one way barricading parts, connecting to the inside of the big tank; the base set joins the bottom of the body shell, having switching solenoid valves to control the big tanks for alternating between the intake and outtake of air.

6 Claims, 9 Drawing Sheets

MULTICHANNEL CIRCULATION OXYGEN GENERATOR

BACKGROUND OF THE INVENTION

1. Field of the Invention

The present invention relates to multi-channel circulation oxygen generators, and more particularly to one featuring multiple channels of an all-in-one body shell, in which peripheral accessories in coordination are included, where the dynamic filtration, intake, and outtake of air are all multiple channels in circulation; which is fully characterized as the oxygen generator of novel in combination, compact in assembly, handy in carrying, and reducible in cost and price.

2. Description of the Prior Art

As the advancement on civilization of human society, medical technology and many important respects is boosted, human beings have already tremendous improvements on the research and control of diseases, and the average life-span of human is also lengthened, which definitely males the arrival of the aging society an unavoidable trend; on the other hand, it has also brought about many adverse influences, wherein the severe damage of the global environment is most denounced; therefore, at times inexplicable diseases (for instance: Severe Acute Respiratory Syndrome (SARS)) or extremely awful environment (for instance: rainstorm, bitter cold and torturing hot weather, or mudflows) indeed fight back to humans, and it deserves us to think over the whys. With a vast anxiety over the outside environment, and inevitable to deal with the possibilities of being invaded by the gradually awful environment and the inexplicable diseases, human beings should be ready for all kinds of prevention, and oxygen is all absolutely indispensable element for humans to survive, where the oxygen generator, capable of self-producing oxygen, by introducing high pressure air to react with the internally filled molecular sieve substances, is an important first-aid appliance; not only is the oxygen generator used in emergencies, it is also required by many symptoms of chronic diseases, for instance, it is essential to have the oxygen generator prepared anytime for the emergency use by the patients of asthma and dyspnoea; moreover, the more people breath in pure oxygen, the better circulation of blood they have, which also enables the mind to be sharply nimble, the body to get rid of fatigues and the work efficiency to be substantially boosted; therefore, during daily life or in the office, it is a great custom to equip with an oxygen generator ready anytime for the emergency.

Prior art oxygen generators are mostly made up of off-the-shelf parts and modules; therefore, the volume of the assembly is unbound and bulky, which no doubt deteriorates the carrying or transportation, and it could further boost the cost that fails to offer a competitive price, which is really bad. In light of the aforesaid drawbacks, the inventor conceived an idea of achieving the oxygen generator that features novel in combination, compact in assembly, handy in carrying and reducible in cost and price.

SUMMARY OF THE INVENTION

The objective of the present invention is to provide an oxygen generator featuring multiple channels of an all-in-one body shell, in which the peripheral coordinated accessories in coordination are included, where the dynamic filtration, intake, and outtake of air are all multiple channels in circulation; which is fully characterized as the oxygen generator of novel in combination, compact in assembly, handy in carrying, and reducible in cost and price.

To be aimed at the aforementioned objective, the present invention developed a multi-channel circulation oxygen generator, comprising a body shell, a top cover set and a base set; wherein the body shell is an all-in-one shape with its top end and bottom end are open, and its internal is shaped into a plurality of connecting septum walls that form a plurality of big tanks which are filled with molecular sieve substances, where its surrounding is provided with a set of gas intake passage, an gas storage tank and a set of gas outtake passage; the big tanks are hollow inside; the set of gas intake passage is made up of several hollow gas intake channels, where each pair of the adjoined gas intake channels are provided with a circulating cavity alternately at the top or the bottom of the septum wall between them, which forms a top and a bottom circulations; the gas storage tank is an independent hollow duct; the set of the gas outtake passage is made up of several hollow gas outtake channels, where each pair of the adjoined gas outtake channels are provided with a circulating cavity alternately at the top or the bottom of the septum wall between them, which forms a top and a bottom circulations;

The top cover set is made up of a top cover and a top spacer, assembled fixedly on the top of the body shell; the top cover is provided with a pressure regulator and an outtake tube set up on its top, and with a gas inlet and a gas outlet at its sides; the top cover is provided with a plurality of big circular dents corresponding to the aforesaid big tanks, and the big circular dents each covers a small circular dent, where a gas collecting tube joins the small circular dents and is provided with a gas collecting hole in the middle of its bottom which extends downward to the gas storage tank; a chamber is set up to fit in the gas storage tank, and the pressure regulator and the outtake tube are set up inside the chamber, where the chamber has a through hole at its bottom, to let the air of the gas storage tank in, and further into the pressure regulator and the outtake tube; the gas inlet and the gas outlet both extend to the internal of the top cover; an elastic article is placed in the small circular dent, covering it with a gas shut membrane to hold the elastic article, further with a gas shut cover, which has a through hole at its center, again covering with a filter net and a filter slice, and having the filter slice, the filter net, the edge of gas shut cover penetrated through orderly by a fastener, followed by a fastening with the threaded hole at the outer edge of the small circular dent, to seal the gas shut membrane in between the gas shut cover and the small circular dent; the top spacer is closely attached to the bottom side of the top cover, and big circular openings are placed at the place corresponding to the big circular dents; a through hole is set up at the place corresponding to the gas collecting hole; a piercing hole is set up at the place corresponding to the chamber; a through hole is set up at the place corresponding to each of the gas inlet and the gas outlet;

The base set is made up of a base and a bottom spacer, and assembled fixedly at the bottom of the body shell; the base is provided with a plurality of big circular dents at its top side corresponding to the aforesaid big tanks; a gas-in hole is set up in each of the big circular dents; a gas-in hole is placed corresponding to the last gas intake channel of the gas intake passage; a gas-out hole is placed corresponding to the first gas outtake channel of the gas outtake passage; the base is provided with a plurality of switching solenoid valves at its bottom corresponding to the aforesaid big tanks, which control the circulation or cutoff between the gas-in hole of the big circular dent and the gas-in hole of the last gas intake channel of the gas intake passage, and control the circulation or cutoff between the gas-in hole of the big circular dent and the gas-out hole of the first gas outtake channel of the gas outtake passage; the bottom spacer is positioned closely between the base and the bottom side of the body shell; and a plurality of big circular openings are set up at the bottom spacer corresponding to the big circular dents and the big tanks; a through hole is set up corresponding to each of the gas-in hole of the last gas intake channel of the gas intake passage and the gas-out hole of the first gas outtake channel of the gas outtake passage.

In the aforesaid multi-channel circulation oxygen generator, the body shell is provide with a plurality of orderly arranged heat dissipation ribs shaped at its outer surface.

In the aforesaid multi-channel circulation oxygen generator, the top cover is provided with a regulating solenoid valve at its top, and a small diameter vent tube is set up in between the big circular dents, one of the big circular dent has its exit terminal joined with the regulating solenoid valve, for the control of the circulation or cutoff of the vent tube by the regulating solenoid valve;

In the aforesaid multi-channel circulation oxygen generator, the body shell is provided with a set of gas passage shaped in its inside, which is made up of a plurality of hollow airflow channels, where each pair of the adjoined airflow channels is provided with a circulating cavity alternately at the top or the bottom of the septum wall between them, which forms a top and a bottom circulations; the top cover is provided with an airflow inlet and an airflow outlet at its sides, where the airflow inlet is positioned at the front of the gas passage, whereas the airflow outlet is positioned at the back of the gas passage.

In the aforesaid multi-channel circulation oxygen generator, the base is provided with a plurality of liquid-out cavities at its top corresponding to the several gas intake channels of the gas passage, where the liquid-out cavity is made up of a plurality of liquid-out holes near the rim and a positioning hole at the center; offering the positioning post extended downward from a liquid shut membrane to penetrate into the positioning hole of the liquid-out cavity for a fixing, and the membrane happens to cover the liquid-out holes thoroughly.

In the aforesaid multi-channel circulation oxygen generator, the number for the multiple big tanks is more than (equal to) two.

DETAILED DESCRIPTION OF THE INVENTION

To achieve the foregoing objects of the present invention, the techniques adopted and the achievable functioning are detailed described with reference to the following preferred exemplified embodiments and the accompanying drawings, which helps a thorough comprehension of the present invention.

Figure 1:
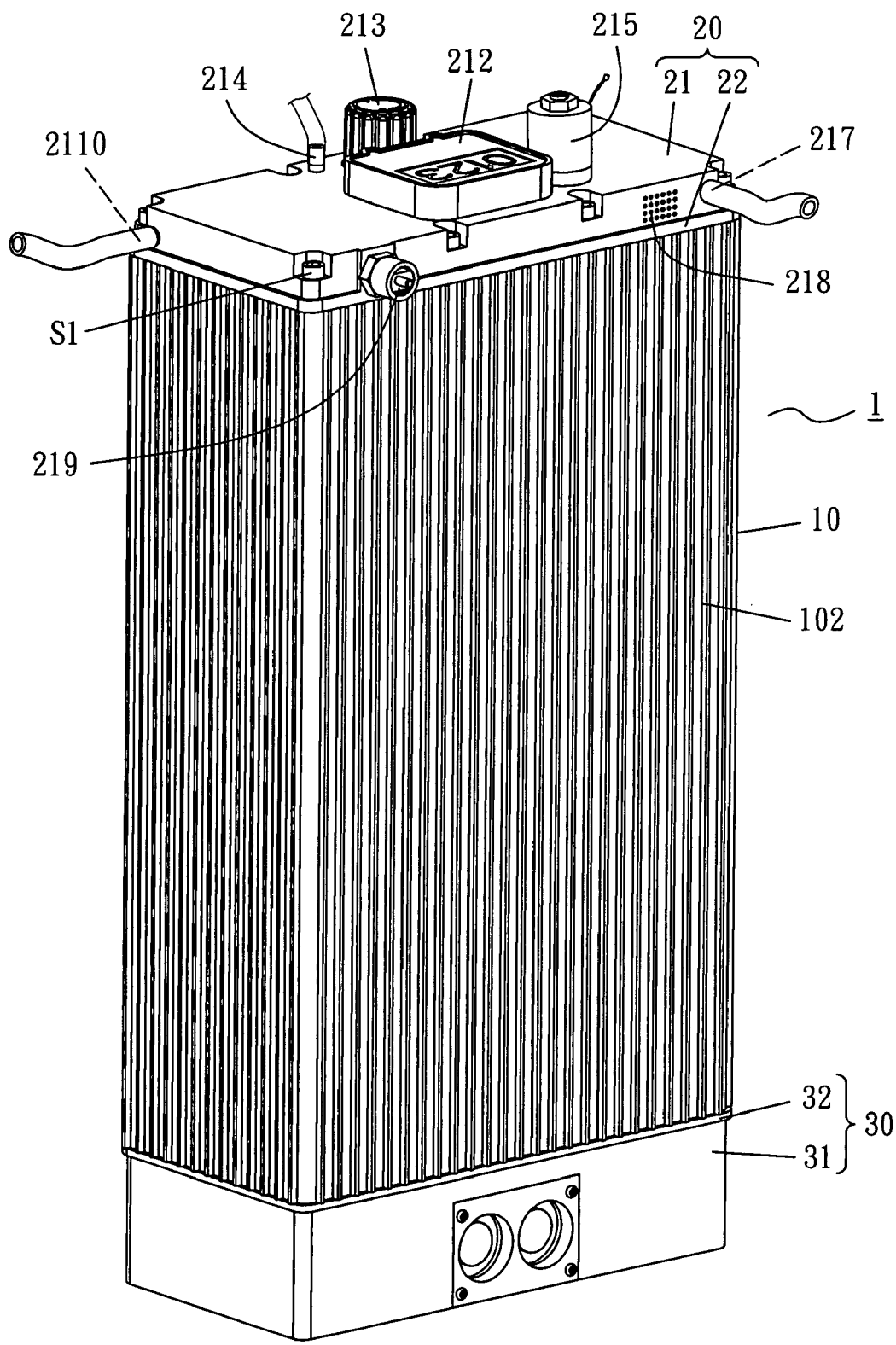
FIG. 1 is a three-dimensional exterior view of the exemplified embodiment of the present invention.
Figure 2:
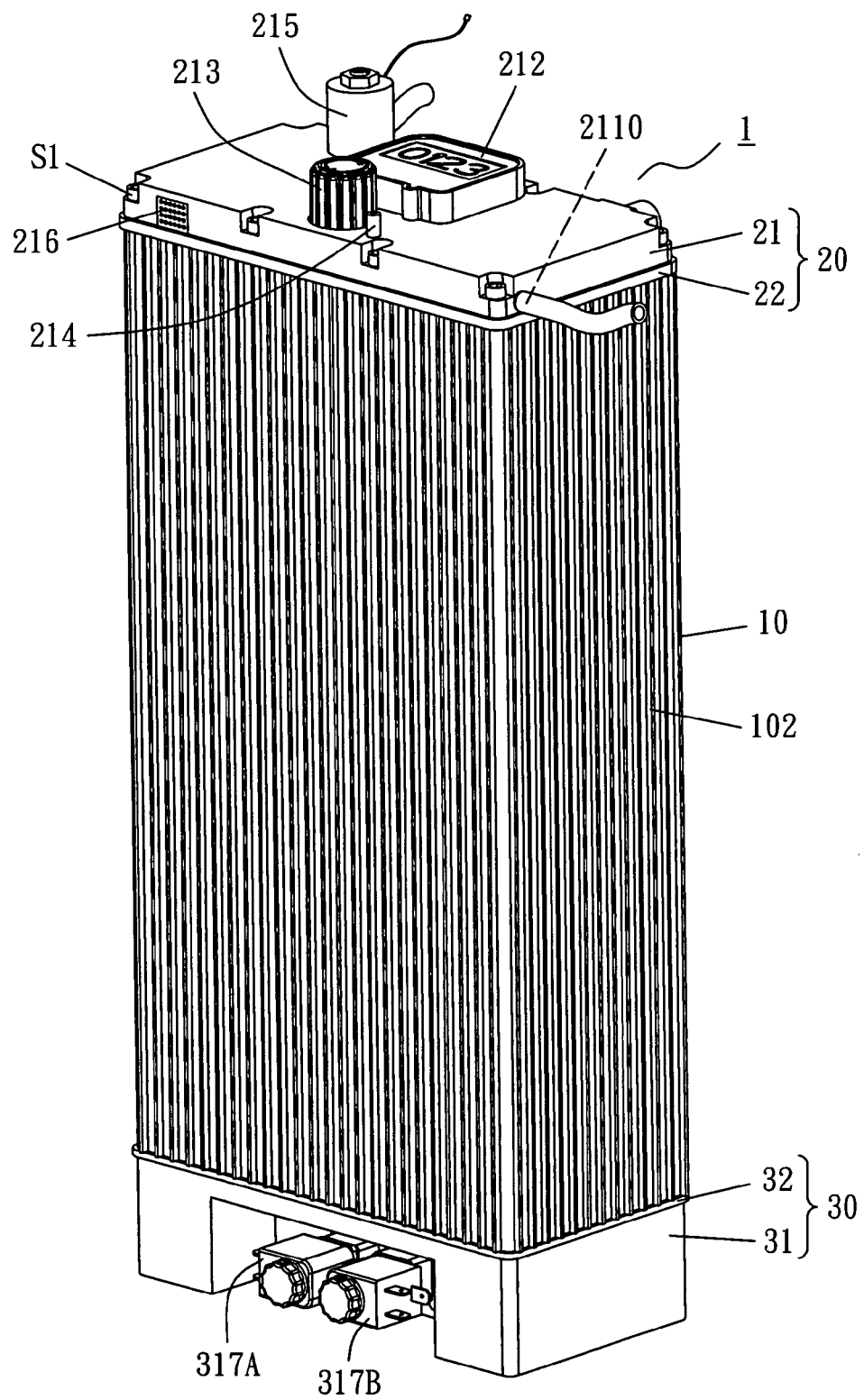
FIG. 2 is a three-dimensional exterior view from a different angle of the exemplified embodiment of the present invention.
Figure 3:
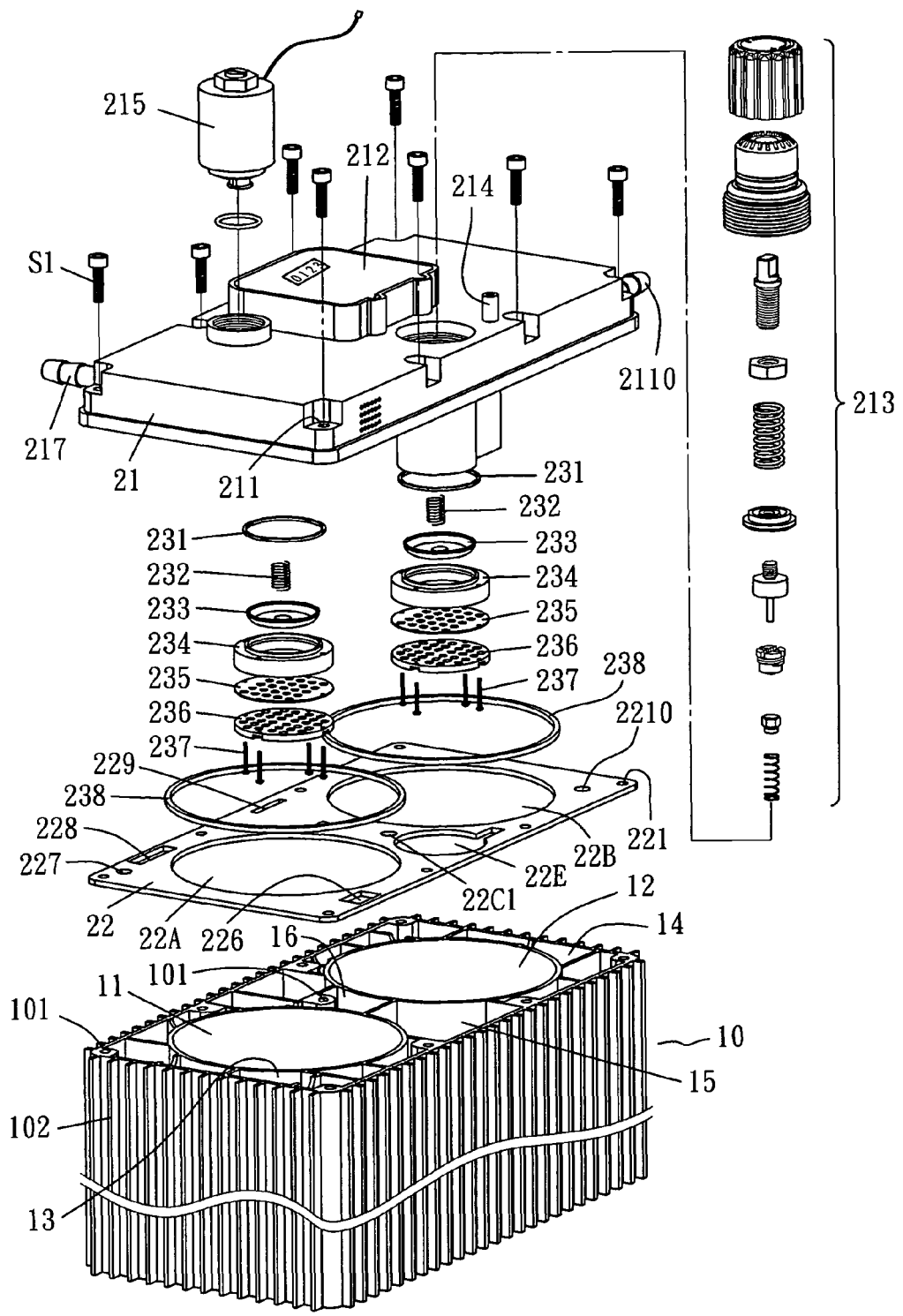
FIG. 3 is a three-dimensional exploded view of the body shell and the top cover of the exemplified embodiment of the present invention.
Figure 4:
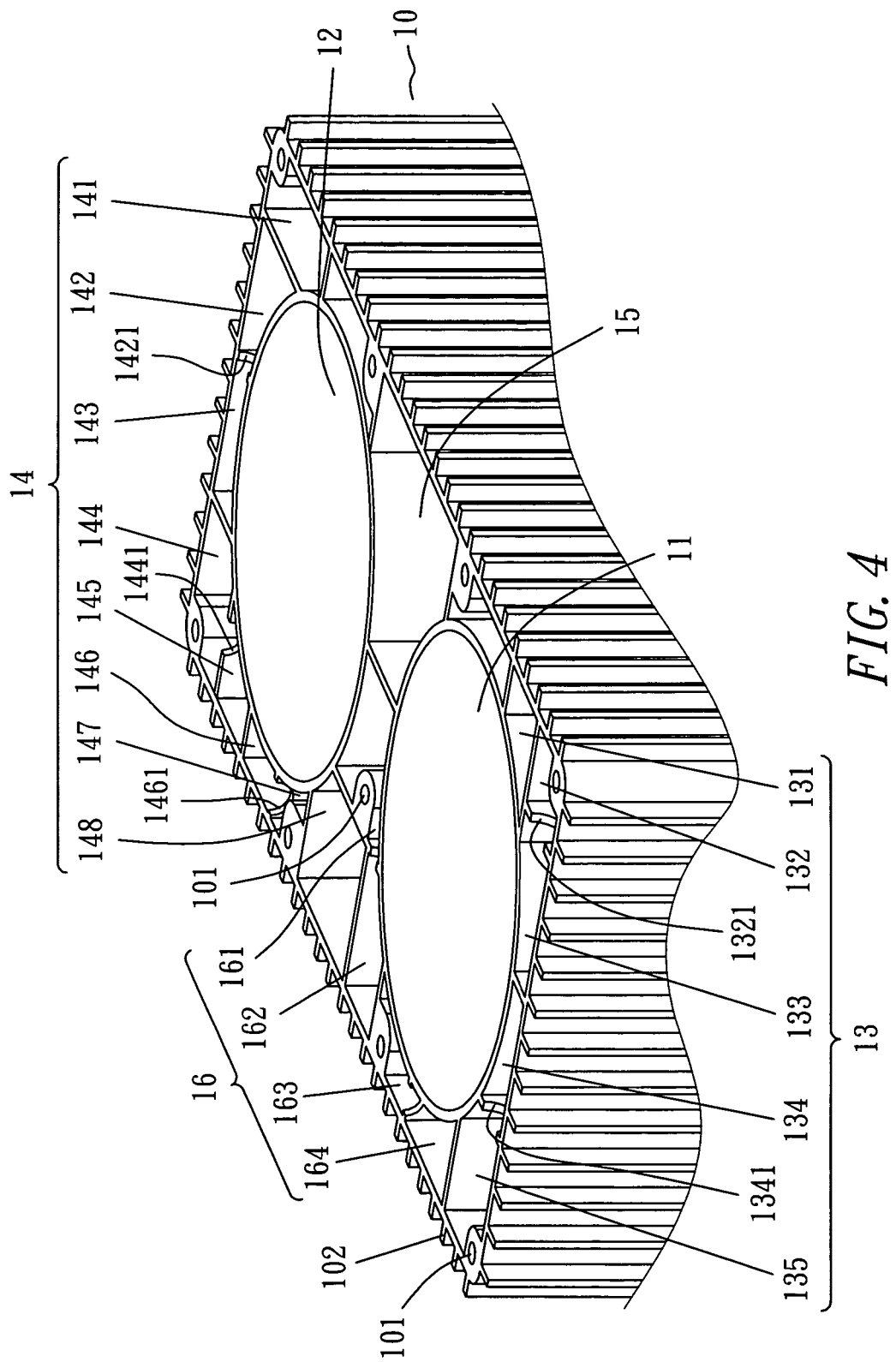
FIG. 4 is a three-dimensional view of the top of the body shell of the exemplified embodiment of the present invention.
Figure 5:
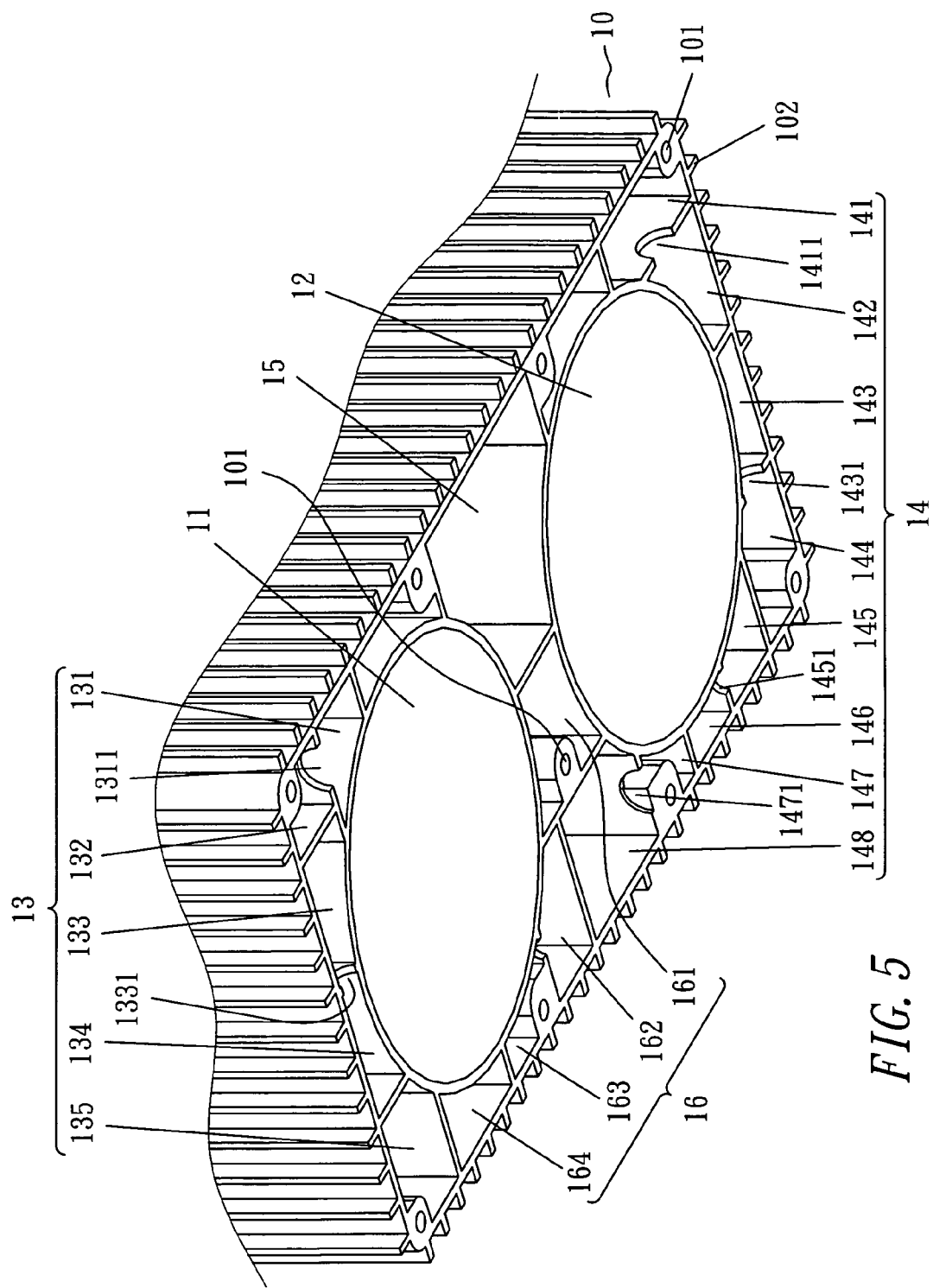
FIG. 5 is a three-dimensional view of the bottom of the body shell of the exemplified embodiment of the present invention.
Figure 6:
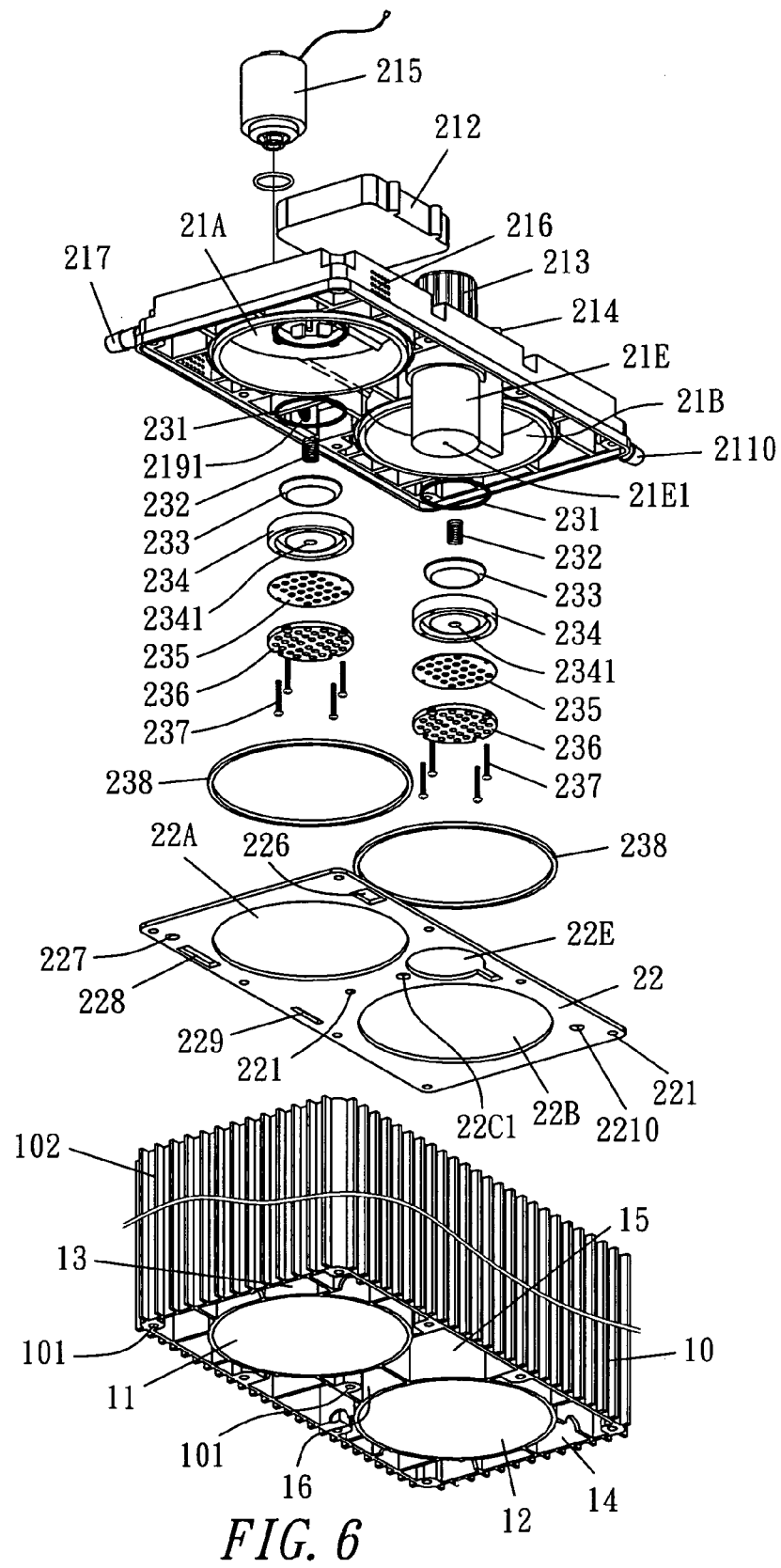
FIG. 6 is a three-dimensional exploded bottom view of the body shell and the top cover of the exemplified embodiment of the present invention.
Figure 7:
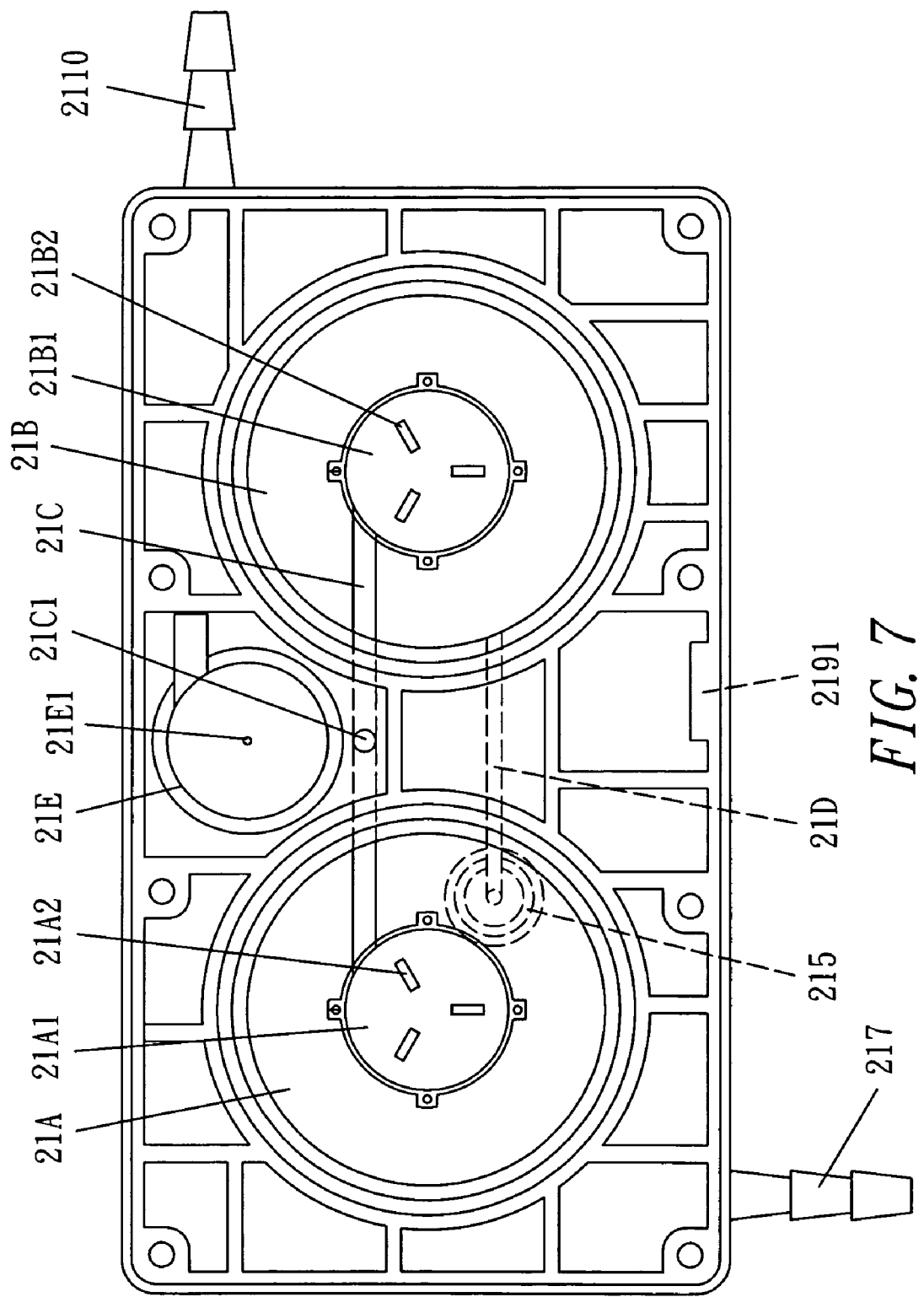
FIG. 7 is a bottom view of the top cover of the exemplified embodiment of the present invention.

Referring to FIGS. 1 & 2, the exemplified embodiment of the present invention is an oxygen generator 1, comprising a body shell 10, a top cover set 20 and a base set 30; wherein the body shell 10 is an all-in-one shape fabricated by extrusion process with its top end and bottom end are open and is a preferred cuboid; referring to FIGS. 3-5, which are viewing from the bottom and the top, the body shell 10 is provided with a plurality of hollow mounting holes 101 at the corners and middles on its top and bottom rims, where its external sides are shaped into a plurality of orderly arranged heat dissipation ribs 102, and its internal is shaped into a plurality of connecting septum walls that form a left and a right big tanks 11, 12, where its surrounding is provided with a set of gas passage 13, a set of gas intake passage 14, an gas storage tank 15 and a set of gas outtake passage 16; the big tanks 11, 12 are hollow inside; the set of gas passage 13 is made up of several hollow airflow channels, where a first airflow channel 131 and its adjoined second airflow channel 132 are provided with a cavity 1311 (shown in FIG. 5) at the bottom of the septum wall between them, the second airflow channel 132 and its adjoined third airflow channel 133 are provided with a cavity 1321 (shown in FIG. 4) at the top of the septum wall between them, the third airflow channel 133 and its adjoined fourth airflow channel 134 are provided with a cavity 1331 (shown in FIG. 5) at the bottom of the septum wall between them, and the fourth airflow channel 134 and its adjoined fourth airflow channel 135 are provided with a cavity 1341 (shown in FIG. 4) at the top of the septum wall between them; as the top and bottom of the body shell 10 are sealed up, once air is pumped into the first airflow channel 131, it will flow through the cavity 1311, the second airflow channel 132, the cavity 1321, the third airflow channel 133, the cavity 1331, the fourth airflow channel 134, and the cavity 1341, into the fifth airflow channel 135 for a stay, which makes the airflow undergo a top and a bottom circulations, and pumping out from the other route, the details will be discussed in the later section; The set of the gas intake passage 14 is made up of several hollow gas intake channels, where a first gas intake channel 141 and its adjoined second gas intake channel 142 are provided with a cavity 1411 (shown in FIG. 5) at the bottom of the septum wall between them, the second gas intake channel 142 and its adjoined third gas intake channel 143 are provided with a cavity 1421 (shown in FIG. 4) at the top of the septum wall between them, the third gas intake channel 143 and its adjoined fourth gas intake channel 144 are provided with a cavity 1431 (shown in FIG. 5) at the bottom of the septum wall between them, the fourth gas intake channel 144 and its adjoined fifth gas intake channel 145 are provided with a cavity 1441 (shown in FIG. 4) at the top of the septum wall between them, the fifth gas intake channel 145 and its adjoined sixth gas intake channel 146 are provided with a cavity 1451 (shown in FIG. 5) at the bottom of the septum wall between them, the sixth gas intake channel 146 and its adjoined seventh gas intake channel 147 are provided with a cavity 1461 (shown in FIG. 4) at the top of the septum wall between them, the seventh gas intake channel 147 and its adjoined eighth gas intake channel 148 are provided with a cavity 1471 (shown in FIG. 5) at the bottom of the septum wall between them; as the top and bottom of the body shell 10 are sealed up, once air is pumped into the first gas intake channel 141, it will flow through the cavity 1411, the second gas intake channel 142, the cavity 1421, the third gas intake channel 143, the cavity 1431, the fourth gas intake channel 144, the cavity 1441, the fifth gas intake channel 145, the cavity 1451, the sixth gas intake channel 146, the cavity 1461, the seventh gas intake channel 147, and the cavity 1471, into the eighth gas intake channel 148 for a stay, which makes the airflow undergo a top and a bottom circulations, and will then be pumped out from the other passage, the details will be discussed in the later section;

The gas storage tank 15 is located at the back portion of the internal of the body shell 10, and is an independent hollow duct; the set of the gas outtake passage 16 is made up of several hollow gas outtake channels, where a first gas outtake channel 161 and its adjoined second gas outtake channel 162 are provided with a cavity 1611 (shown in FIG. 4) at the top of the septum wall between them, the second gas outtake channel 162 and its adjoined third gas outtake channel 163 are provided with a cavity 1621 (shown in FIG. 5) at the bottom of the septum wall between them, the third gas outtake channel 163 and its adjoined fourth gas outtake channel 164 are provided with a cavity 1631 (shown in FIG. 4) at the top of the septum wall between them, which makes the outtake gas undergo a top and a bottom circulations, and will then be pumped out from the other passage, the details will be discussed in the later section;

Referring to FIGS. 1-3, 6 & 7, the top cover set 20 is made up of a top cover 21 and a top spacer 22, where the top cover 21 is provided with a plurality of mounting holes 211 at its edge which correspond to the mounting holes 101 on the rim of the body shell 10, and both together can be fastened by a fastener S1 (for instance: bolt); a pressure meter 212, a pressure regulator 213, a gas outtake tube 214 and a regulating solenoid valve 215 are set up at its top; along the sides of the top cover, an airflow inlet 216 is set up at the back; an airflow outlet 217, a gas outlet 218 and a safety valve 219 are set up at the front; and a gas inlet 2110 is set up at the lateral; the bottom side (shown in FIGS. 6 & 7) of the top cover 21 is formed into a plurality of spaces partitioned by the joining of several connected septum walls, where their quantity and positions of the spaces are subject to their counterparts, the spaces partitioned by the joining of several connected septum walls in the body shell 10, which includes two big circular dents 21A, 21B corresponding to the aforesaid two big tanks 11, 12, where the big circular dents 21A, 21B are provided with small circular dents 21A1, 21B1 respectively, and a gas collecting tube 21C, joined the small circular dent 21A1 to the small circular dent 21B1, has a downward gas collecting hole 21C1 at the center of its bottom; a small diameter vent tube 21D is set up between the big circular dent 21A and the big circular dent 21B, where its exit terminal at the big circular dent 21A is connected to the regulating solenoid valve 215, and the regulating solenoid valve 215 then controls the flow or cutoff of the vent tube 21D; the small circular dents 21A1, 21B1 each is set up with a few (for instance: three) chunks 21A2, 21B2 and each partitions a space; a chamber 21E is set up to fit in the gas storage tank 15, and the pressure regulator 213 and the outtake tube 214 are set up inside the chamber 21E, which has a through hole 21B1 at its bottom, helping to pump in the air in the gas storage tank 15, and further into the pressure regulator 213 and the outtake tube 214, and connecting to a pressure meter 212, where the pressure meter 212 shows the pressure value of the gas storage tank 15, and the pressure regulator 213 regulates the outtake pressure of the outtake tube 214; the airflow inlet 216, airflow outlet 217, gas outlet 218 and gas inlet 2110 are all connected into the internal of the top cover 21; an opening 2191 is set up at the place corresponding to the eighth gas intake channel 148, which is connected to the safety valve 219; aside from the above structure, the small circular dents 21A1, 21B1 are provided with parts capable of accomplishing filtering and one-way barricading, which is implemented by placing a sealing ring 231 on each rim of the small circular dents 21A1, 21B1, and placing an elastic article 232 at the space in between the chunks 21A2, 21B2 of each of the small circular dents 21A1, 21B1, followed by capping each with a gas shut membrane 233, to hold the elastic article 232, then capping each with a gas shut cover 234, which has a through hole 2341 at its center, again capping each with a filter net 235 and a filter slice 236, and the filter slice 236, the filter net 235 and the edge of gas shut cover 234 are penetrated orderly by several fasteners 237 (for instance: bolt), to fasten with the threaded holes at the outer edge of the small circular dents 21A1, 21B1, which is targeted to seal the gas shut membrane 233 in between the gas shut cover 234 and the small circular dent 21A1, 21B1, with a press on the elastic article 232; a sealing ring 238 is placed on each of the rim of the big circular dents 21A, 21B; The top spacer 22 is closely attached to the bottom side of the top cover 21, and its rim is provided with mounting holes 221 which correspond to the mounting holes 211 of the top cover 21 and both can be placed together for being penetrated by a fastener S1, and having a mounting hole 221 at its center; having two big circular openings 22A, 22B at the places corresponding to the big circular dents 21A, 21B; a through hole 22C1 is set up at the place corresponding to the gas collecting hole 21C1; a piercing hole 22E is set up at the place corresponding to the chamber 21E; through holes 226, 227, 228 and 2210 are set up corresponding to the airflow inlet 216, the airflow outlet 217, the gas outlet 218 and the gas inlet 2110 respectively; a through hole 229 is set up corresponding to the place of the eighth gas intake channel 148; in assembling, the top spacer 22 is attached first to the top side of the body shell 10, and the top cover 21 are placed on the top side of the top spacer 22, followed by placing the sealing rings 238 in between the big circular dent 21A, 21B and the big circular opening 22A, 22B respectively, and the mounting holes 211, 221, 101 are penetrated through by the fastener S1 with a firmly fastening.

Figure 8:
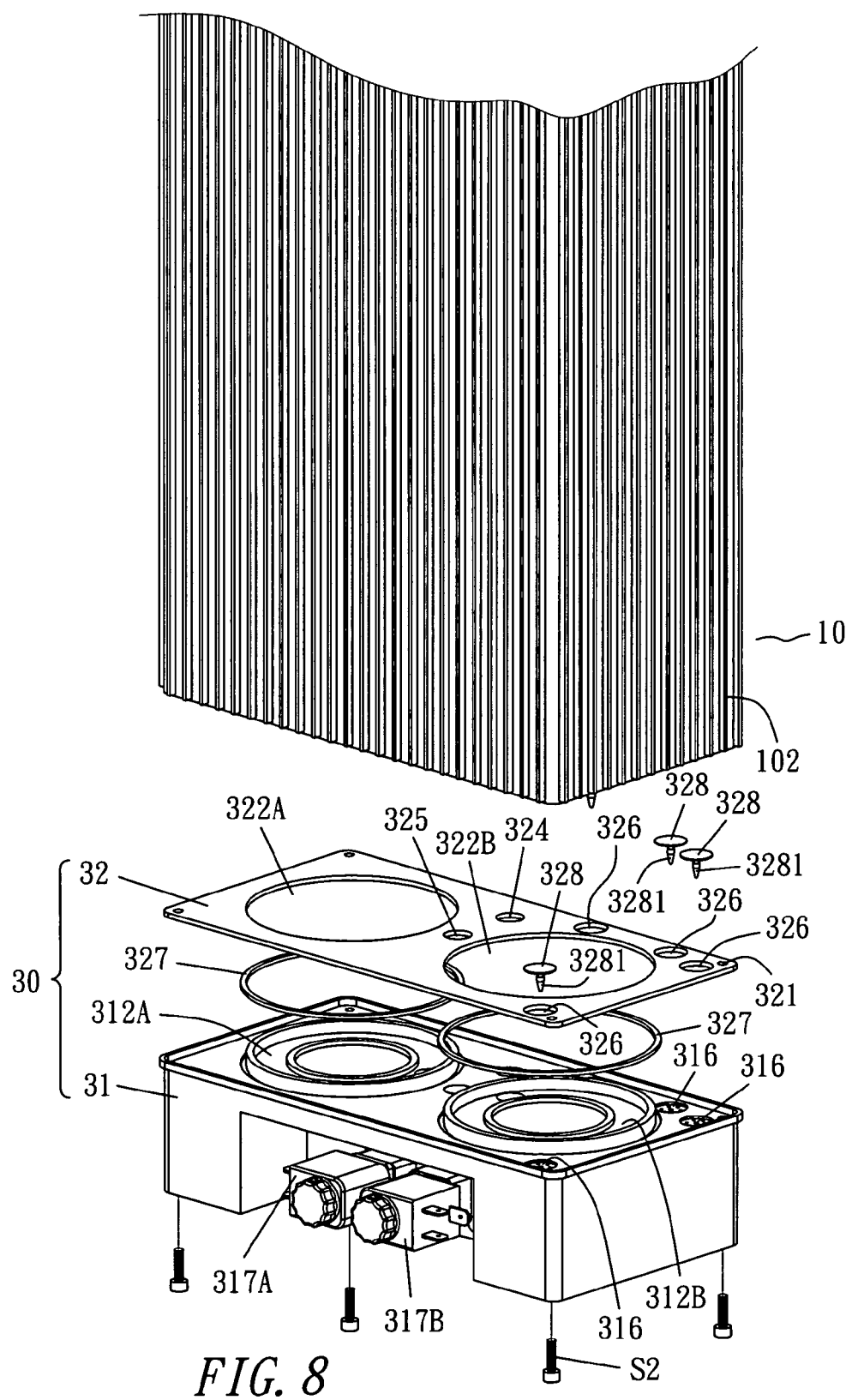
FIG. 8 is a three-dimensional exploded view of the body shell and the base set of the exemplified embodiment of the present invention.
Figure 9:
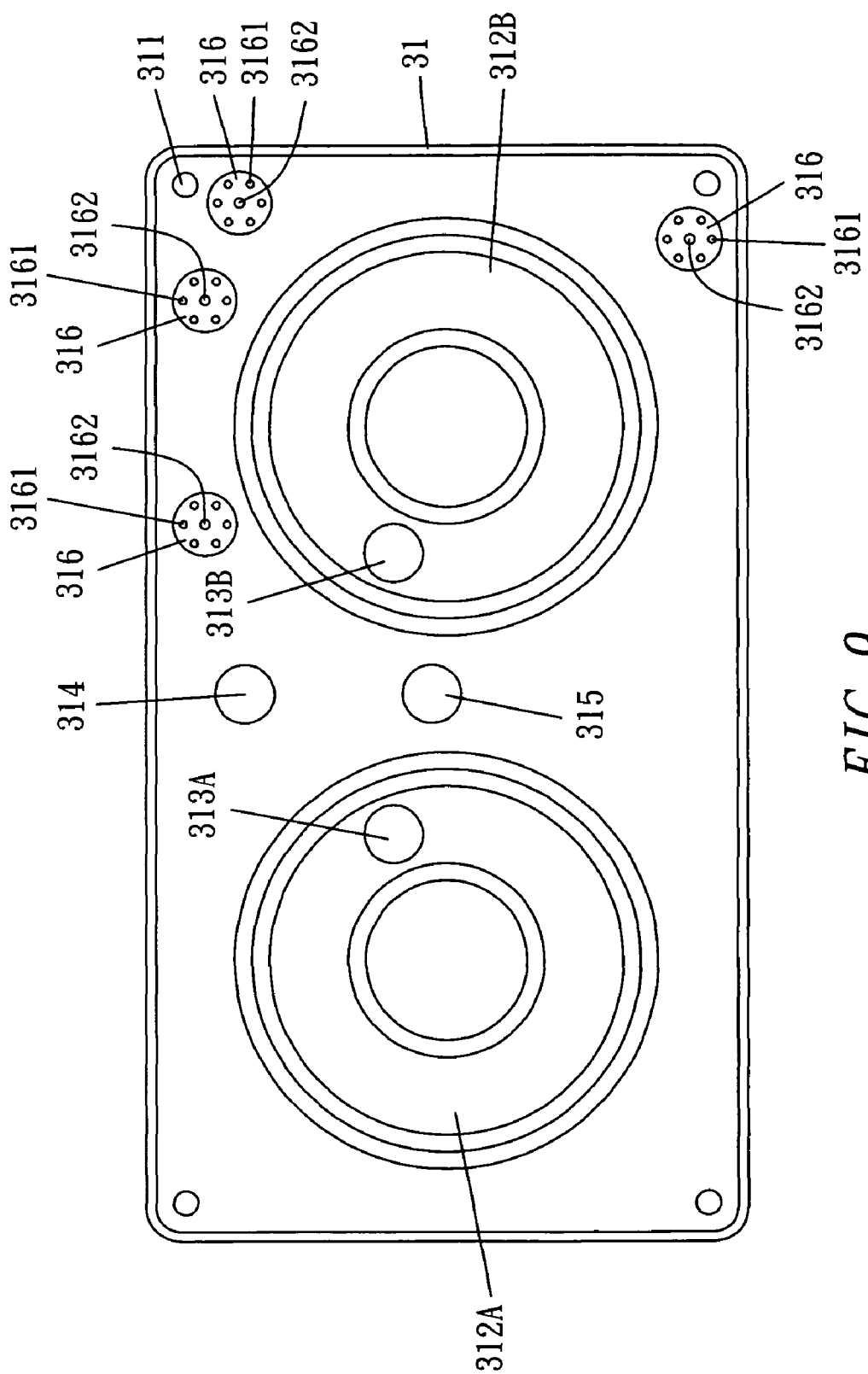
FIG. 9 is a top view of the base of the exemplified embodiment of the present invention.

Referring to FIGS. 8 & 9, the base set 30 is made up of a base 31 and a bottom spacer 32, where the base 31 is provided with a plurality of mounting holes 311 at its rim that correspond to the mounting holes 101 of the body shell 10, where both together are penetrated by a fastener S2 for a fastening, and having two big circular dents 312A, 312B at its top corresponding to the aforesaid two big tanks 11, 12 respectively; the big circular dents 312A, 312B are provided with gas-in holes 313A, 313B within their boundary; a gas-in hole 314 is set up corresponding to the place of the eighth gas intake channel 148; a gas-out hole 315 is set up corresponding to the place of the first gas outtake channel 161; liquid-out cavities 316 are set up corresponding to the places of several gas intake channels of the gas intake passage 14, where the liquid-out cavity is made up of a plurality of liquid-out holes 3161 near the rim and a positioning hole 3162 at the center; the base 31 is provided with two switching solenoid valves 317A, 317B at its bottom, where the switching solenoid valve 317A is able to control the flow or cutoff between the gas-in hole 314 and the gas-in hole 313A in the base 31, and to control the flow or cutoff between the gas-in hole 313A and the gas-out hole 315; while the switching solenoid valve 317B is used to control the flow or cutoff between the gas-in hole 314 and the gas-in hole 313B, and to control the flow or cutoff between the gas-in hole 313B and the gas-out hole 315;

The bottom spacer 32, closely placed between the base 31 and the bottom side of the body shell 10, is provided with a plurality of mounting holes 321 at its rim corresponding to the mounting holes 311 of the base 31, for the penetration and fastening by the fastener S2; two big circular openings 322A, 322B are set up corresponding to the places of the two big circular dents 312A, 312B; a piercing hole 324, 325 is set up corresponding to the places of the gas-in hole 314 and the gas-out hole 315 respectively; piercing holes 326 are set up corresponding to the places of the liquid-out cavities 316; a sealing ring 327 is placed on each rim of the big circular dents 312A, 312B; a liquid shut membrane 328 is inserted over each of the liquid-out cavities 316, where the membrane has a downward extended positioning post 3281 at its center, to penetrate into the positioning hole 3162 of the liquid-out cavity 316 for a fixing, and the membrane itself just cover the liquid-out holes 3161 completely; during the assembly, attaching the bottom spacer 32 to the top side of the base 31 first, then placing the sealing ring 238 in between the big circular dent 312A, 312B and the big circular opening 323A, 323B, followed by attaching the bottom side of the body shell 10 to the top side of the bottom spacer 32, and lastly the mounting holes 311, 321 and 101 are penetrated by the fastener S2 for a fixing.

The use of the oxygen generator 1 of this invention is subject to an air pump for providing the power for pumping air. The air pump is already a prior art device, so that it is not included in the scope of the patent of this invention. When in use, a connecting tube is used to connect the airflow outlet 217 of this invention to the inlet of the air pump, and another connecting tube is used to connect the outlet of the air pump to the gas inlet 2110; power on the air pump to pump the air out from the airflow outlet 217, and pump the air into the gas inlet 2110; the function of pumping air out will enable the outside air to flow into the airflow inlet 216, and flows through the through hole 226, to the first airflow channel 131, where the rest of the route the air will flow through includes the cavity 1311, the second airflow channel 132, the cavity 1321, the third airflow channel 133, the cavity 1331, the fourth airflow channel 134, the cavity 1341 and the fifth airflow channel 135, and then flows through the through hole 227 and exits from the airflow outlet 217, where the air finally flows in the connecting tube to the air pump. Suppose the airflow channels 131, 132, 133, 134 and 135 are filled with air filtration substances (for instance: filtration cotton and the like substances or composite substances), the air sucked in is thus processed for an elementary filtration; moreover, a top and a bottom circulation for the airflow would lengthen the filtration process and eliminate the noises.

The air pump then delivers the filtered air to the gas inlet 2110. The route for the air to flow through includes the through hole 2210, the first gas intake channel 141, the cavity 1411, the second gas intake channel 142, the cavity 1421, the third gas intake channel 143, the cavity 1431, the fourth gas intake channel 144, the cavity 1441, the fifth gas intake channel 145, the cavity 1451, the sixth gas intake channel 146, the cavity 1461, the seventh gas intake channel 147, the cavity 1471, the eighth gas intake channel 148, and then the air flows through a piercing hole 324 to the gas-in hole 314, also through the opening 2191 to the safety valve 219, once the incoming air pressure is too high, a release of the air pressure is needed for safety reason; when air enters the gas-in hole 314, an auto-control system (optional, not shown) takes the control of the switching solenoid valves 317A, 317B to undergo a routinely alternate activation, which means once the switching solenoid valve 317A activates (the switching solenoid valve 317B pauses, or reacts after a period of time), the gas-in hole 314 and the gas-in hole 313A are connected (the gas-in hole 314 and the gas-in hole 313B are cut off, which pumps air into the bottom of the big tank 11. Since the big tanks 11, 12 are filled with molecular sieve substances, the air is forced to pass through the molecular sieve substances to transform into oxygen that flows up for gathering; the oxygen then flows through the big circular opening 22A of the top spacer 22 to the big circular dent 21A of the top cover 21, and through the filter slice 236, the filter net 235 and the piercing hole 2341 into the gas shut cover 234. The pressure of the oxygen then presses the gas shut membranes 233 to resist the elastic force exerted by the elastic article 232 to move up, which makes its membrane rim to overturn for producing gaps, and the high-pressure oxygen is then passing through the gas shut membranes 233 to the gas collecting tube 21C, and from the gas collecting hole 21C1 to the gas storage tank 15 for a stay, which gathered into high pressure. As the oxygen comes to the gas collecting tube 21C, it also comes to the gas shut cover 234 corresponding to the big tank 12, where its pressure pushes the gas shut membranes 233 down to cover the piercing hole 2341, to block the oxygen flowing from here into the big tank 12, and the gas shut membrane 233 is an exemplified embodiment of an one way barricading device; whenever the big tank 12 is not suitable for no oxygen, the auto-control system will control the regulating solenoid valve 215 to activate, for pumping a small amount of oxygen from the big tank 11 through the vent tube 21D to the big tank 12 for a stay, which makes the real time oxygen output possible.

Since the process of air passing through the molecular sieve substances to transform into oxygen generates heat; therefore, this invention makes use of shaped vent ribs 102 to broaden the area of heat dissipation, which undoubtedly can dissipate heat earlier; the auto-control system will control the switching solenoid valve 317A to pause after some time of running, which enables an instantaneous cutoff between the gas-in hole 314 and the gas-in hole 313A, such that the air in the eighth gas intake channel 148 is ceased to flow into the big tank 11; meanwhile, the auto-control system will timely control the other switching solenoid valve 317B to activate, which enables the circulation between the gas-in hole 314 and the gas-in hole 313B, such that the air is delivered into the bottom of the big tank 12 and forced to pass through the molecular sieve substances to transform into oxygen that flows up for gathering; similarly, passing the filtration and one way barricading to the gas storage tank 15 for a stay; and in the same measure, by activating the regulating solenoid valve 215, to pump a small amount of oxygen to flow from the big tank 12 through the vent tube 21D to the big tank 11 for a stay.

The gas intake channels 141, 142, 143, 144, 145, 146, 147 and 148 are selectively filled with air filtration substances, which definitely enables the air passing through be much cleaner; the airflow undergoes a top and a bottom orderly circulation in the gas intake passage 14, which helps to diminish the noises; once the air flows through the air pump, it will be heated, and the moment it comes to the gas intake passage 14, liquid water is generated during the temperature is lowered, which flows down to the liquid shut membrane 328. Once the liquid water is accumulated to certain amount, the gravitational force will press the center portion of the liquid shut membrane 328 to sink, which brings in gaps between the edges of the membrane and the liquid-out cavity 316, enabling the liquid water flows through the gaps into the liquid-out holes for drainage. As the amount of liquid water diminishes, the liquid shut membrane 328 will immediately recover.

As the switching solenoid valve 317A or 317B quits activating, to get rid of the high gaseous pressure (residual gases after the oxygen transformation, for instance; nitrogen) at the bottom of the big tank 11 or 12, the auto-control system will operate the switching solenoid valve 317A or 317B to enable the circulation between gas-in hole 313A or 313B and the gas-out hole 315, and the gases in the bottom of the big tank 11 or 12, due to the circulation between gas-in hole 313A or 313B and the gas-out hole 315, will flow to the first gas outtake channel 161, and through the cavity 1611, the second gas outtake channel 162, the cavity 1621, the third gas outtake channel 163, the cavity 1631, the fourth gas outtake channel 164 and the through hole 228 to the gas outlet 218 for exhausting to the atmosphere, which makes the exhaust undergo a top and a bottom orderly circulation within the gas outtake passage 16, the movement is deemed as being regulated, which will diminish the noises.

In this invention, the amount of oxygen in the gas storage tank 15 is raised, subject to the alternate generation of oxygen by the big tanks 11 and 12, where the stored oxygen is ready for use directly. Once oxygen is demanded, an extended pipe (shown in FIG. 1) is inserted into the outtake tube 214 for the user's convenient access, and switch on the air-out button (optional, not shown in the figure) to let the high pressure oxygen flow out from the outtake tube 214 to the extended pipe. It's essential to describe further that the foregoing exemplified embodiment is based on adopting "two" big tanks 11, 12; therefore, all the other parts that operated in coordination with the two big tanks have the quantity of two. These parts include big circular dents 21A & 21B, small circular dents 21A1 & 21B1, two sealing rings 231, two elastic articles 232, two gas shut membranes 233, two gas shut covers 234, two piercing holes 2341, two filter net 235, two filter slices 236, two fasteners 237, two sealing rings 238, big circular dents 312A & 312B, gas-in holes 313A & 313B, big circular openings 322A & 322B and switching solenoid valves 317A & 317B, which all have quantity of two, to form two sets that can generate oxygen alternately. However, the actual implementation is not limited to only two sets in quantity. It could be three, four and the like, which is within the range of the claims of the present invention.

Accordingly, the present invention makes use of the coordination among the body shell, top cover and the base set and the combination with the auxiliary parts, to achieve a multi-channel circulating oxygen generator that features multiple channel circulation for the filtration, air intake and outtake; the structural combination of the present invention is absolutely a novel spatial pattern, compact for the assembly, convenient in the carrying or transporting and enough room for cutting down the cost and price. The spatial pattern of the structural combination of the disclosed oxygen generator of the present invention is not only unknown to the prior art, but absolutely being novel, which can accomplish the expected objective and function, and is construed as being absolutely creative and is compliant to the requirements of patent law, and a patent application for the invention is then filed.

What is claimed is:

1. A multi-channel circulation oxygen generator, comprising: a body shell, a top cover set and a base set; wherein said body shell is an all-in-one shape having an open top end and bottom end, and having an interior shaped into a plurality of connecting septum walls that form a plurality of big tanks which are filled with molecular sieve substances, the big tanks being surrounded by a set of gas intake passage, a gas storage tank and a set of gas outtake passage; the big tanks being hollow inside; the set of gas intake passage being made up of several hollow gas intake channels, where pairs of adjoined gas intake channels are provided with a circulating cavity alternately at the top or the bottom of the septum wall between them, which forms a top and a bottom circulations; the gas storage tank being an independent hollow duct; the set of gas outtake passage being made up of several hollow gas outtake channels, where pairs of adjoined gas outtake channels are provided with a circulating cavity alternately at the top or the bottom of the septum wall between them, which forms a top and a bottom circulations; said top cover set being made up of a top cover and a top spacer, assembled fixedly on the top of said body shell; the top cover being provided with a pressure regulator and an outtake tube set up on top of the top cover, and with a gas inlet and a gas outlet at sides of the top cover; the top cover being provided with a plurality of big circular dents corresponding to the aforesaid big tanks, and the big circular dents each covering a respective small circular dent, where a gas collecting tube joins the small circular dents and is provided with a gas collecting hole in the middle of a bottom part of the gas collecting tube which extends downward to the gas storage tank; a chamber being set up to fit in the gas storage tank, and the pressure regulator and the outtake tube being set up inside the chamber, where a bottom of the chamber has a through hole, to let the air of the gas storage tank in, and further into the pressure regulator and the outtake tube; the gas inlet and the gas outlet both extending to the internal of the top cover; in each of the small circular dents, an elastic article being placed in the small circular dent, a gas shut membrane covering the elastic article to hold the elastic article, further with a gas shut cover, which has a through hole at its center, a filter net and a filter slice covering the gas shut cover, the filter slice, the filter net, the edge of the gas shut cover being penetrated by a fastener fastened with a threaded hole at the outer edge of the small circular dent, to seal the gas shut membrane in between the gas shut cover and the small circular dent; the top spacer being closely attached to the bottom side of the top cover, and big circular openings being placed at the place corresponding to the big circular dents; a through hole being set up at the place corresponding to the gas collecting hole; a piercing hole being set up at the place corresponding to the chamber; a through hole being set up at the place corresponding to each of the gas inlet and the gas outlet; said base set being made up of a base and a bottom spacer, and assembled fixedly at the bottom of said body shell; the base being provided with a plurality of big circular dents at a top side of the base corresponding to the aforesaid big tanks; a gas-in hole being set up in each of the big circular dents; a gas-in hole being placed corresponding to the last gas intake channel of the gas intake passage; a gas-out hole being placed corresponding to the first gas outtake channel of the gas outtake passage; the base being provided at a bottom of the base with a plurality of switching solenoid valves corresponding to the aforesaid big tanks, which control the circulation or cutoff between the gas-in hole of the big circular dent and the gas-in hole of the last gas intake channel of the gas intake passage, and controlling the circulation or cutoff between the gas-in hole of the big circular dent and the gas-out hole of the first gas outtake channel of the gas outtake passage; the bottom spacer being positioned closely between the base and the bottom side of said body shell; and a plurality of big circular openings being set up at the bottom spacer corresponding to the big circular dents and the big tanks; a through hole being set up corresponding to each of the gas-in hole of the last gas intake channel of the gas intake passage and the gas-out hole of the first gas outtake channel of the gas outtake passage.

2. A multi-channel circulation oxygen generator as in claim 1 wherein an outer surface of said body shell is provided with a plurality of orderly arranged heat dissipation ribs shaped.

3. A multi-channel circulation oxygen generator as in claim 1 wherein the top cover is provided at a top of the top cover with a regulating solenoid valve, and a small diameter vent tube being set up in between the big circular dents, where an exit terminal of the top cover in one big circular dent joins with the regulating solenoid valve, enabling the control of circulation or cutoff of the vent tube by the regulating solenoid valve.

4. A multi-channel circulation oxygen generator as in claim 1 wherein said body shell has an interior provided with a set of gas passage, the gas passage being made up of a plurality of hollow airflow channels, where pairs of adjoined airflow channels are each provided with a circulating cavity alternately set up at the top or the bottom of the septum wall between them, which forms a top and a bottom circulations; the top cover being provided at sides of the top cover with an airflow inlet and an airflow outlet, where the airflow inlet is positioned at the front of the gas passage, whereas the airflow outlet is positioned at the back of the gas passage.

5. A multi-channel circulation oxygen generator as in claim 1 wherein the base is provided at a top of the base with a plurality of liquid-out cavities corresponding to some of the several hollow gas intake channels of the gas intake passage, where each of the liquid-out cavities is made up of a plurality of liquid-out holes near the rim and a positioning hole at the center; a liquid shut membrane disposed over each of the liquid-out cavities, the liquid shut membrane having a positioning post extended downward from the liquid shut membrane to penetrate into the positioning hole of the liquid-out cavity for fixing the liquid shut membrane to cover the liquid-out holes thoroughly.

6. A multi-channel circulation oxygen generator as in claim 1 wherein the number for the multiple big tanks is at least two.

* * * * *